(12) United States Patent
Ichimura et al.

(10) Patent No.: US 9,586,388 B2
(45) Date of Patent: Mar. 7, 2017

(54) CHIP-RESISTANT FILM

(71) Applicant: NICHIBAN CO., LTD., Tokyo (JP)

(72) Inventors: Syuji Ichimura, Tokyo (JP); Masataka Sudo, Tokyo (JP); Tomohisa Kato, Tokyo (JP)

(73) Assignee: NICHIBAN CO., LTD., Tokyo (JP)

( * ) Notice: Subject to any disclaimer, the term of this patent is extended or adjusted under 35 U.S.C. 154(b) by 0 days.

(21) Appl. No.: 14/564,799

(22) Filed: Dec. 9, 2014

(65) Prior Publication Data

US 2015/0090391 A1    Apr. 2, 2015

Related U.S. Application Data

(62) Division of application No. 12/086,562, filed as application No. PCT/JP2005/023107 on Dec. 16, 2005, now abandoned.

(51) Int. Cl.
| | | |
|---|---|---|
| *B32B 37/12* | (2006.01) | |
| *C09J 5/00* | (2006.01) | |
| *B32B 27/32* | (2006.01) | |
| *C09J 7/02* | (2006.01) | |
| *C09J 133/02* | (2006.01) | |

(52) U.S. Cl.
CPC ............. *B32B 37/12* (2013.01); *B32B 27/32* (2013.01); *C09J 5/00* (2013.01); *C09J 7/0296* (2013.01); *C09J 133/02* (2013.01); *C09J 2201/162* (2013.01); *C09J 2423/006* (2013.01); *C09J 2433/00* (2013.01); *Y10T 156/10* (2015.01); *Y10T 428/2848* (2015.01)

(58) Field of Classification Search
CPC .................................. B32B 37/12; C09J 5/00
See application file for complete search history.

(56) References Cited

U.S. PATENT DOCUMENTS

| | | | | |
|---|---|---|---|---|
| 6,149,750 A | * | 11/2000 | Parish, Jr. ........... | B24B 13/0057 156/154 |
| 2002/0055006 A1 | * | 5/2002 | Vogel ................... | B29C 47/043 428/520 |
| 2006/0072777 A1 | | 4/2006 | Ohashi et al. | |

FOREIGN PATENT DOCUMENTS

| | | |
|---|---|---|
| EP | 0955346 | 11/1999 |
| JP | 56-20193 | 5/1981 |
| JP | 60-127149 | 7/1985 |
| JP | 1-188337 | 7/1989 |
| JP | 1-188579 | 7/1989 |
| JP | 9-157610 | 6/1997 |
| JP | 9-277379 | 10/1997 |
| JP | 10-53748 | 2/1998 |
| JP | 10-298514 | 11/1998 |
| JP | 3069550 | 6/2000 |
| JP | 2002-200719 | 7/2002 |
| JP | 2003-342386 | 12/2003 |
| JP | 2004-115657 | 4/2004 |
| JP | 2005-272558 | 10/2005 |
| WO | WO-01/78981 | 10/2001 |
| WO | WO-02-078954 | 10/2002 |

* cited by examiner

*Primary Examiner* — Daniel Lee
(74) *Attorney, Agent, or Firm* — Norris McLaughlin & Marcus, P.A.

(57) ABSTRACT

A chip-resistant film includes a composite substrate having an ionomer layer and a polyolefin-based polymer layer, with a strength at upper yield point of 10 to 40 N/10 mm, wherein a pressure-sensitive adhesive, which may be an acrylic pressure-sensitive adhesive, is placed over the polyolefin-based polymer layer. The chip-resistant film may also include an intermediate adhesive layer positioned between the ionomer layer and the polyolefin-based polymer layer. The chip resistance of an object to which the chip-resistant film has been applied is improved.

8 Claims, 1 Drawing Sheet

| composition | | Ex. 1 | Ex. 2 | Ex. 3 | Ex. 4 | Com. Ex. 1 | Com. Ex. 2 | Com. Ex. 3 | Com. Ex. 4 |
|---|---|---|---|---|---|---|---|---|---|
| surface hard layer | | SH-1 100 μm | SH-1 100 μm | SH-1 100 μm | SH-2 100 μm | SH-3 100 μm | SH-1 300 μm | SH-1 100 μm | SH-1 100 μm |
| intermediate adhesive layer | | MA-1 20 μm | MA-2 20 μm | MA-2 20 μm | — | MA-1 20 μm | — | MA-1 20 μm | MA-3 10 μm |
| inner soft layer | | IS-1 180 μm | IS-2/IS-3 =50/50 (Wt./Wt.) 180 μm | IS-2/IS-3/IS-4 =40/40/20 (Wt./Wt.) 180 μm | IS-5 180 μm | IS-3 180 μm | — | IS-4 180 μm | IS-3 190 μm |
| pressure-sensitive adhesive | | AD-1 50 μm | | | | | | | |
| chip resistance | | ○ | ○ | ○ | ○ | × | ○ | ○ | ○ |
| application workability | ease of application | ○ | ○ | ○ | ○ | × | ○ | ○ | ○ |
| | conformability | ○ | ○ | ○ | ○ | ○ | × | × | × |
| type D durometer hardness of surface hard layer | | D45/30 | D45/30 | D45/30 | D46/30 | D36/30 | D45/30 | D45/30 | D71/30 |
| strength at upper yield point of substrate (N/10mm) | | 19.4 | 16.8 | 26.8 | 26.0 | 8.1 | 47.8 | 59.0 | 104.0 |

Note: Each layer of the substrate was added 0.2 part by weight each of WR-1 and WR-2 on the basis of 100 parts by weight of each layer material.

CHIP-RESISTANT FILM

STATEMENT OF RELATED APPLICATIONS

The present application is a divisional application of copending U.S. patent application Ser. No. 12/086,562 filed Jun. 16, 2008, which is the U.S. National Stage of International Application No. PCT/JP2005/023107 filed Dec. 16, 2005. The disclosures of these applications are incorporated herein by reference.

BACKGROUND OF THE INVENTION

The present invention relates chip-resistant films for protecting various surfaces against the phenomenon in which pebbles, small objects and the like on roads are bounced up by wheels to impinge upon automobile bodies to damage coated surfaces of the bodies while the automobiles are running.

For exterior cladding of automobiles, steel plates or resin materials that are molded and covered on their surfaces with a coating or the like are widely used. Among them, those on the side and underside of the bodies are likely to develop scratches, cracks, dents and the like on the coated surfaces of the steel plates and exterior parts due to impingement or the like of hard objects such as rocks bounced up by tires while running.

In order to prevent such scratches, cracks, dents and the like from occurring on the surfaces, chip-resistant coating has conventionally been carried out using vinyl chloride-based sols. Such sols may, however, produce dioxin when they are incinerated. Also, chip-resistant films made of urethane-based substrates that are covered with a fluorine coating are applied over coated surfaces to protect the surfaces. The raw materials and the coating are, however, expensive, thereby rendering the chip-resistant films expensive. Due to such restrictions in cost, therefore, they can not be applied to all the portions where scratches, cracks, dents or the like are likely to develop on the surfaces and are often used only partly, suffering from substantial problems.

Patent Reference 1: Japanese Unexamined Patent Publication No. 1997-277379

SUMMARY OF THE INVENTION

As such, it is the object of the present invention to provide a chip-resistant film capable of protecting various surfaces, in particular, preventing scratches, cracks, dents and the like from occurring on exterior cladding of automobiles, conforming to convexoconcave and terminal portions of objects to be applied and being applied easily and esthetically, in an economical manner.

The present invention (1) is a chip-resistant film comprising a composite substrate having an ionomer layer and a polyolefin-based polymer layer, with a strength at upper yield point of 10 to 40 N/10 mm, wherein a pressure-sensitive adhesive is placed over the polyolefin-based polymer layer of the substrate.

The present invention (2) is the chip-resistant film according to the invention (1) wherein the pressure-sensitive adhesive is an acrylic pressure-sensitive adhesive.

The present invention (3) is the chip-resistant film according to the invention (1) or (2) wherein the ionomer layer has a type D durometer hardness of D40/30 to D55/30.

The present invention (4) is the chip-resistant film according to any one of the inventions (1) to (3) further comprising an intermediate adhesive layer between the ionomer layer and the polyolefin-based polymer layer.

According to the present invention, such an effect is provided that by selecting an ionomer layer as a surface hard layer and a polyolefin-based polymer layer as an inner soft layer and combining them in such a manner that a predetermined strength at upper yield point may be achieved, a chip-resistant film capable of preventing scratching from occurring on exterior cladding of automobiles, conforming to convexoconcave and terminal portions and being applied easily and esthetically, may be obtained in an economical manner.

BRIEF DESCRIPTION OF THE DRAWING

The unlabelled FIGURE is Table 1, which relates to the Example and Comparative Example described below.

DETAILED DESCRIPTION OF THE INVENTION

A best mode of the present invention will be described below. The chip-resistant film according to the present invention is composed of a composite substrate to which a pressure-sensitive adhesive is applied. First, description will be made of the composite substrate.

The composite material according to the best mode is composed of an ionomer layer, a polyolefin-based polymer layer and optionally an intermediate adhesive layer laminated between the ionomer layer and the polyolefin-based polymer layer. Each of the layers will be described in detail.

First, examples of ionomers for composing the ionomer layer include polyolefin-based ionomers, acrylic ionomers, polystyrene-based ionomers, polyester-based ionomers and combinations thereof. Specifically, examples of polyolefin-based ionomers include ethylene/methacrylate copolymers, ethylene/acrylate copolymers and ethylene/sulfonated ethylene salt copolymers; examples of acrylic ionomers include ethyl acrylate/acrylate copolymers, ethyl acrylate/methacrylate copolymers, methyl methacrylate/acrylate copolymers and methyl methacrylate/methacrylate copolymers; examples of polystyrene-based ionomers include styrene/styrene sulfonate copolymers, styrene/acrylate copolymers, styrene/methacrylate copolymers, styrene/styrene carboxylate copolymers and styrene/N-methyl-4-vinyl pyridinium salt copolymers and examples of polyester-based ionomers include sulfoterephthalate-co-polyethylene terephthalate, sulfoisophthalate-co-polyethylene terephthalate, sulfoterephthalic acid-co-polybutylene terephthalate and sulfoisophthalic acid-co-polybutylene terephthalate. For weatherability, polyolefin-based ionomers and acrylic ionomers are preferred and for solvent resistance, polyolefin-based ionomers are preferred.

With respect to transparency, wear resistance, low-temperature resistance, heatsealability and toughness, α-olefin/α, β-unsaturated carboxylic acid copolymers that are neutralized with metallic ions are preferable as ionomers. Examples of metallic ions for neutralizing copolymers include monovalent metallic ions such as sodium and lithium ions, divalent metallic ions such as zinc and calcium ions and trivalent metallic ions such as aluminum ion. Specific examples of preferred ionomers may include Himilan 1601 (trade name for an ionomer resin based on an ethylene-methacrylic acid copolymer neutralized by zinc ion) manufactured by Du Pont-Mitsui Polychemicals Co., Ltd., Himilan 1650 (trade name for an ionomer resin based on an ethylene-methacrylic acid copolymer neutralized by zinc ion) manufactured by Du Pont-Mitsui Polychemicals Co., Ltd. and Himilan 1855 (trade name for an ionomer resin based on an ethylene-methacrylic acid copolymer neutralized by zinc ion) manufactured by Du Pont-Mitsui Polychemicals Co., Ltd. Particularly preferred ionomers are those excellent in weatherability, durability and wear resistance that are made by ethylene/methacrylic acid copolymers or ethylene/acrylic acid copolymers whose molecules are bridged by metallic ions such as sodium and zinc.

Here, the ionomer layer has a type D durometer hardness of preferably D40/30 to D55/30 and of particularly preferably around D45/30 (±1, for example). Here, "type D durometer hardness" refers a value measured in relation to a surface hard layer 6 mm in thickness according to JIS K-7215 for type D durometer hardness. The preceding "D" of the value means that the value is measured using a type D durometer and the following number represents a value of hardness. The number following "/" represents an elapsed time, in second, after an indenter of the type D durometer was tightly attached to a surface hard layer until a hardness is measured. For example, a notation of D80/30 means the elapsed time after an indenter was tightly attached to a surface hard layer until a hardness is measured is 30 seconds and a hardness as measured by a type D durometer is 80. When the type D durometer hardness is set within such a range, all of such problems that hard objects such as rocks impinge upon coated surfaces to cause scratches, cracks, dents and the like of the surfaces, that insufficient flexibility makes it unable to conform to convexoconcave and terminal portions so that delamination or lifting of chip-resistant films may tend to occur and that forces such as bending and tension are exerted to cause cracks and whitening of chip-resistant films may effectively be avoided. Such physical properties can appropriately be varied by changing rate of copolymerization (preferably, rate of copolymerization of ionic monomers is from 20 to 100 mol %), degree of neutralization and the like. Here, "rate of copolymerization of ionic monomers" refers to a content of ionic monomer units in relation to the whole monomer units (mol %) and "degree of neutralization" refers to a conversion to a salt by neutralization of ionic functional groups contained in ionic monomers (0 to 100%).

Next, examples of polyolefin-based polymers which can be used for composing the polyolefin-based polymer layer according to the best mode include various homopolymers and copolymers of olefins and combinations thereof. Examples of homopolymers include ethylene, propylene, 1-butene, isoprene and butadiene. Examples of copolymers may include copolymers of such olefins as described above, for example, ethylene-α-olefin copolymers (for example, ethylene-propylene copolymers, ethylene-1-butene copolymers and ethylene-octene copolymers) and propylene-α-olefin copolymers, copolymers of such monomers as described above with other vinylic monomers (for example, vinyl acetate, vinyl alcohol, vinyl chloride and acrylic acid), for example, ethylene-cycloolefin copolymers, ethylene-vinyl acetate copolymers and ethylene-acrylate copolymers.

The substrate according to the best mode may include another layer, for example an adhesive layer, between the ionomer layer and the polyolefin-based polymer layer as long as the substrate comprises the ionomer layer and the polyolefin-based polymer layer. The other layer is effective in increasing adhesion between the ionomer layer and the polyolefin-based polymer layer. Here, it is preferable that, in addition to providing good adhesion in relation to both the layers, the layer maintains weatherability for a prolonged period of time after adhesion and has enough flexibility to conform to asperities and curves of attached parts within a practical range of temperatures.

The ionomer layer and the polyolefin-based polymer layer according to the best mode may contain other components as long as they comprise an ionomer and an polyolefin-based polymer, respectively, as principal components. For example, ultraviolet absorbers and ultraviolet stabilizers based on hindered amines, hindered phenols, benzotriazoles, benzophenones, benzoates, triazines, lactones, phosphorus and so on, antioxidants based on hindered, semihindered, phosphites, phosphonites, thioethers and so on, processing stabilizers based on metallic soaps, organic tin, lead and so on, antistatic agents based on surface active agents, cationic types, nonionic types and so on, antiblocking agents based on synthetic silica, silica and so on, lubricants, such as stearic acid, stearic acid amides, calcium stearate, barium stearate, zinc stearate and so on as well as releasability imparting agents such as silicone-based and long-chain alkyl-based releasability imparting agents may be contained.

Next, each layer of the substrate according to the best mode will be described with respect its thickness. First, the ionomer layer has a thickness preferably in the range of 50 to 200 μm and more preferably in the range of 75 to 150 μm. Within such ranges, such problems that hard objects such as rocks impinge upon film surfaces to cause breaks, scratches, whitening and the like and that conformability deteriorates may effectively be avoided. Next, the polyolefin-based polymer layer has a thickness preferably in the range of 50 to 300 μm and more preferably in the range of 100 to 200 μm. Within such ranges, the deterioration of conformability and the degradation of appearance after application due to an increase in the total thickness may effectively be avoided. Next, the intermediate adhesive layer as an optional layer has a thickness preferably in the range of 5 to 200 μm and more preferably in the range of 10 to 150 μm in view of the uniform film formation and the costs.

Next, the substrate according to the best mode has a strength at upper yield point in the range of 10 to 40 N/10 mm and preferably in the range of 15 to 35 N/10 mm in view of the conformity to convexconcave and terminal portions of objects to be applied and the easy and esthetic application. Here, "strength at upper yield point" refers to a value of strength in a process of stressing a material for deformation at which, as stress is gradually increased, permanent deformation begins to drastically increase with little or no increase of the stress. Specifically, it refers to a value as determined by a tensile test on a specimen having a width of 10 mm and a gauge length of 50 mm in accordance with JIS K-7161 for tensile yield strength. When the strength at upper yield point is within the ranges described above, such problems that application works are difficult to achieve because a substrate is flexible and lacks stiffness, that air bubbles are likely to be caught between a chip-resistant film and an object to be applied and that insufficient flexibility makes it unable to conform to convexconcave and terminal portions of an object to be applied so that delamination or lifting of a chip-resistant film is likely to occur can be avoided. In order to achieve such ranges as described above for the substrate, selection, thickness and the like of materials for each layer are varied as appropriate.

Next, the chip-resistant film according to the best mode has a pressure-sensitive adhesive applied over the substrate. Pressure-sensitive adhesives are not particularly limited, examples of which may include acrylic, rubber-based and silicone-based adhesives, with acrylic pressure-sensitive adhesives being preferred in terms of weatherability and costs. Thickness is preferably in the range of 10 to 70 μm.

Within such a range, such a possibility that sufficient adhesive strength may not be obtained so that delamination or lifting may occur at terminal portions and that a chip-resistant film may be displaced after application may effectively be avoided.

Next, a process for producing the chip-resistant film according to the best mode will be described. First, a composite substrate according to the best mode can be formed by coextrusion with the use of an adhesive resin, extrusion lamination, extrusion lamination with the use of a solvent-based adhesive or dry lamination. If adhesion between an ionomer layer and a polyolefin-based polymer layer is sufficiently good, an intermediate adhesive layer may not be included.

In order to increase the adhesion strength between the substrate and the adhesive, the polyolefin-based polymer layer may be surface-treated with corona discharge or the like. In place of or in addition to such a surface treatment, an anchor coating may be provided. Anchor coating agents to be used for the chip-resistant film according to the present invention are not particularly limited, examples of which include acrylic, urethane-based and olefin-based resins, and are provided with a thickness preferably in the range of 0.1 to 20 μm.

After producing the substrate in this manner, a pressure-sensitive adhesive liquid is applied to the inner soft layer of the substrate and dried to form a pressure-sensitive adhesive layer. The substrate can be wound up as it is, but it is preferable to laminate a release paper to the side of pressure-sensitive adhesive to improve handling and workability. When a release paper is applied, a pressure-sensitive adhesive liquid may be laminated with the release paper and dried to provide a pressure-sensitive adhesive layer and then the side of pressure-sensitive adhesive may be laminated with the inner soft surface of the substrate to produce the substrate. A paper or plastic film may be used as release paper and the release paper may be used as it is, but it is preferable to use it after reducing its release strength by silicon treatment or the like. Also, a release paper having regular or irregular asperities may be used to form asperities on the pressure-sensitive adhesive surface for improving the ease of lamination.

Next, a method for using the chip-resistant film according to the best mode will be described. The chip-resistant film according to the best mode is applied to such portions as side sills, lower portions of doors and lower portions of wheel arches of front and rear fenders of automobile bodies where chip resistance is of particular concern.

EXAMPLES

The present invention will be illustrated in more detail with reference to Examples. The present invention is not however limited to these Examples.

Components used in Examples are:
(1) Ionomer Layer
SH-1: Ionomer manufactured by Du Pont-Mitsui Polychemicals Co., Ltd. (Himilan 1601)
SH-2: Ionomer manufactured by Du Pont-Mitsui Polychemicals Co., Ltd. (Himilan 1650)
SH-3: Polyethylene manufactured by Tosoh Corporation (Petrocene 203)
SH-4: Biaxially oriented polyester film manufactured by Futamura Chemical Co., Ltd. (FE2001#50)
(2) Intermediate Adhesive Layer
MA-1: Adhesive polyolefin manufactured by Mitsui Chemicals, Inc. (ADMER SE800; and other olefin-based)
MA-2: Adhesive polyolefin manufactured by Mitsubishi Chemical Corporation (MODIC AP M132C; and other olefin-based)
MA-3: Adhesive manufactured by Dainichiseika Color & Chemicals Mfg. Co., Ltd. (SEIKABOND E-263; polyester phthalate-based)
(3) Polyolefin-Based Polymer Layer
IS-1: Polyolefin-based soft resin manufactured by Prime Polymer Co., Ltd. (Prime TPO T310EC; PP-based)
IS-2: Polyolefin-based soft resin manufactured by Mitsubishi Chemical Corporation (Zelas 7023; PP-based)
IS-3: Olefin-based soft resin manufactured by The Dow Chemical Company (Affinity KC8852; ethylene-octene copolymer-based)
IS-4: Polypropylene manufactured by Prime Polymer Co., Ltd. (F794NV; PP-based)
IS-5: Ionomer manufactured by Du Pont-Mitsui Polychemicals Co., Ltd. (Himilan 1855; PE-based ionomer)
(4) Weathering Agent
WR-1: Benzotriazole-based ultraviolet absorber manufactured by Ciba Specialty Chemicals Inc. (TINUVIN P)
WR-2: Hindered amine-based ultraviolet stabilizer manufactured by Ciba Specialty Chemicals Inc. (CHIMASSORB 944FDL)
(5) Pressure-Sensitive Adhesive
AD-1: 90 parts by weight of butyl acrylate, 10 parts by weight of acrylic acid and 150 parts by weight of ethyl acetate as a solvent are placed in a flask, warmed to 60° C., replacing with $N_2$, and polymerized according to a conventional method with dropwise addition of 0.5 part by weight of LPO dissolved in 50 parts by weight of ethyl acetate as a polymerization initiator. Subsequently, to 100 parts by weight of the polymerized pressure-sensitive adhesive solid content, 0.06 part by weight of a crosslinking agent TETR AD-X manufactured by Mitsubishi Gas Chemical Company, Inc. was added for crosslinking to obtain a pressure-sensitive adhesive. The obtained acrylic pressure-sensitive adhesive had a molecular weight (Mw) of 500,000.

Examples 1 to 4 and Comparative Examples 1 to 3

Transparent laminate films composed as shown in Table 1 were produced in a T-die extrusion film former and corona treated over the surface of the inner soft layer so that the surface wettability may be 40 μN/cm or higher. A release paper was then coated with a pressure-sensitive adhesive AD-1 melted and spread to obtain a dried thickness of 50 μm and the pressure-sensitive adhesive surface of the release paper was laminated with the inner soft layer of the substrate to produce a chip-resistant film.

Comparative Example 4

Using the compositions as shown in Table 1, an adhesive for dry lamination was coated on a biaxially oriented polyester film, dried and laminated by heat lamination with an inner soft layer produced in a T-die extrusion film former to form a substrate. A release paper was then coated with a pressure-sensitive adhesive AD-1 melted and spread to obtain a dried thickness of 50 μm and the pressure-sensitive adhesive surface of the release paper was laminated with the inner soft layer of the substrate to produce a chip-resistant film.

With respect to Examples 1 to 4 and Comparative Examples 1 to 4, chip resistance and application workability were evaluated according to the protocol below. Type D durometer hardness of the ionomer layer of the substrate and strength at upper yield point of the substrate were also determined. The results of testing are shown in Table 1.

Chip Resistance

A chip-resistant film (80 mm×60 mm) was applied to a coated panel and, 24 hours later, was impacted on the surface with gravel using a gravelometer. Thereafter, the appearance of the chip-resistant film surface was visually inspected (for breaks, scratches, whitening and the like). Also, the chip-resistant film was removed to visually inspect the appearance of the coated panel (for scratches, dents and the like).

Coated panel: Electrodeposition coated panel manufactured by Paltec Test Panels Co., Ltd. (SPCC-SD)

Scratched area: 70 mm×60 mm

Gravel: Chips CAT 10×8, manufactured by Nihon Rotofinish

Gravel weight: 390 g

Air pressure: 390 MPa x: Damages such as scratches and dents found on the coated panel surface, or damages such as breaks, scratches and whitening found on the chip-resistant film surface.

o: No damages such as scratches or dents found on the coated panel surface, or no damages such as breaks, scratches or whitening found on the chip-resistant film surface.

A chip-resistant film (80 mm×70 mm) was applied to a bent, coated panel, followed immediately by visual inspection of the presence or absence of air bubbles remaining between the chip-resistant film and the coated panel to evaluate ease of application. Also, 24 hours after application of the chip-resistant film, appearance was visually inspected for conformability (for delamination or lifting at terminal portions from the coated panel surface of the chip-resistant film).

Coated panel: Electrodeposition coated panel manufactured by Paltec Test Panels Co., Ltd. (SPCC-SD)

Bending of panel: at an angle of 90°, R=1.5 mm

Ease of Application x: Air bubbles included between the chip-resistant film and the coated panel.

o: No air bubbles included between the chip-resistant film and the coated panel.

Conformability x: Delamination or lifting found at terminal portions from the coated panel surface of the chip-resistant film.

o: No delamination or lifting found at terminal portions from the coated panel surface of the chip-resistant film.

Type D Durometer Hardness

Determined according to JIS K-7215 on a sheet with a thickness of 6 mm having the same composition as the surface hard layer of the substrate.

Strength at Upper Yield Point

Determined according to JIS K-7161 on a substrate having a width of 10 mm and a chuck spacing of 100 mm.

As apparent from the results of Examples 1 to 4 of Table 1, when the chip-resistant film according to the present invention was applied, both the application workability and chip resistance were good. In contrast, in Comparative Example 1, for chip resistance, the film was scraped, with damages such as breaks and scratches found on the chip-resistant film surface. In addition, air bubbles were disadvantageously included between the chip-resistant film and the coated panel because the film was excessively flexible. In Comparative Example 2, lifting was found between the film and the coated object and delamination was also found at terminal portions. Also, in Comparative Example 3, in a similar manner to Comparative Example 2, lifting was found between the film and the coated object and delamination was also found at terminal, portions. Also in Comparative Example 4, flexibility was insufficient and conformability along portions such as corners was poor, with lifting found between the film and the coated object.

The present invention is useful as a chip-resistant film for protecting various surfaces against the phenomenon in which pebbles, small objects and the like on roads are bounced up by wheels to impinge on automobile bodies to damage coated surfaces of the bodies while the automobiles are running.

The invention claimed is:

1. A method of providing chip resistance to a coated surface of an object, the method comprising:
improving chip-resistance of the object by permanently adhering a transparent chip-resistant film to the coated surface, the chip-resistant film being transparent, colorless bearing no design throughout, the chip-resistant film comprising a composite substrate and a pressure-sensitive adhesive, the composite substrate comprising (A) an ionomer layer and (B) a polyolefin-based polymer layer adjacent the ionomer layer, the film having a strength at the upper yield point of 10 to 40 N/10 mm, wherein the pressure-sensitive adhesive is in direct contact with a side of the polyolefin-based polymer layer of the composite substrate that is opposite the ionomer layer and further wherein the chip-resistant film improves the chip-resistance of the object without obstructing or altering appearance of the coated surface of the object.

2. The method according to claim 1, wherein the pressure-sensitive adhesive is an acrylic pressure-sensitive adhesive.

3. The method according to claim 2, wherein the ionomer layer has a type D durometer hardness of D40/30 to D55/30.

4. The method according to claim 1, wherein the ionomer layer has a type D durometer hardness of D40/30 to D55/30.

5. The method according to claim 1, wherein the polyolefin-based polymer layer consists of polyolefin.

6. The method according to claim 1, wherein the object to which the film is applied is selected from the group consisting of side sills, doors, and wheel arches in the front and rear fenders of automotive bodies.

7. The method according to claim 1, wherein the ionomer layer has a rate of copolymerization of ionic monomers from 20 to 100 mol %.

8. The method according to claim 1, wherein the coated surface of the object comprises convexoconcave or terminal portions of the object.

* * * * *

UNITED STATES PATENT AND TRADEMARK OFFICE
CERTIFICATE OF CORRECTION

PATENT NO. : 9,586,388 B2                                             Page 1 of 1
APPLICATION NO. : 14/564799
DATED : March 7, 2017
INVENTOR(S) : Syuji Ichimura et al.

It is certified that error appears in the above-identified patent and that said Letters Patent is hereby corrected as shown below:

In the Claims

Column 8 Claim 1, Lines 26-27 should be corrected as follows:
From: ". . . the chip-resistant film being transparent, colorless bearing no design throughout . . ."
To: --. . . the chip-resistant film being transparent, colorless and bearing no design throughout . . .--

Signed and Sealed this
Twenty-third Day of May, 2017

Michelle K. Lee
*Director of the United States Patent and Trademark Office*